Patented Dec. 10, 1940

2,224,837

UNITED STATES PATENT OFFICE 2,224,837

POLYMERIC PRODUCT OF AROMATIC HYDROCARBONS SUBSTITUTED BY THE $CH_2=CH-$ RADICAL

Leo Rosenthal and Helmuth Meis, Leverkusen-Wiesdorf, Germany, assignors to I. G. Farbenindustrie Aktiengesellschaft, Frankfort-on-the-Main, Germany No Drawing. Application February 12, 1937, Serial No. 125,434. In Germany April 12, 1935

13 Claims. (Cl. 260—62)

The present invention relates to new polymeric products and to a process of preparing the same.

The new products which are obtainable in accordance with our present invention may be defined as polymeric vinyl compounds of the aromatic series i. e. polymerizates of aromatic hydrocarbons substituted by the $CH_2=CH-$ radical containing in chemical combination aromatic hydroxy compounds and/or ethers thereof. These products are obtainable by causing compounds having a polymerizing action to react upon mixtures of aromatic vinyl compounds on the one hand an aromatic hydroxy compounds and/or ethers thereof on the other hand. Depending on the conditions of working these polymeric products represents viscous difficultly volative oils or solid substances of a resin-like character, the softening point being lowered with an increase of the content of the aromatic hydroxy compounds and/or ethers thereof. The oily products may be employed as softeners or as intermediate products for the preparation of new artificial resins, the resin-like products being suitable also per se for the preparation of artificial masses. The outstanding feature of the resin-like products is their being soluble in the usual lacquer benzines, in the oil of turpentine and in drying or non-drying oils. The reaction products from aromatic vinyl compounds of the character described and such aromatic hydroxy compounds as contain a free para-position with respect to the hydroxy group are even capable of being homogeneously combined with polymerized oils of linseed oil or tung oil. In these respects our new products are clearly differentiated from the hitherto known polymerized aromatic vinyl compounds such as polystyrene or polymeric vinyl naphthalene. Hence follows that they can also be employed for the preparation of lacquers or as additions for other lacquer forming products such as oil-varnishes, cellulose derivatives, chlorinated rubber or condensation products of the phthalic acid anhydride-glycerine type. Moreover, products being derived from aromatic hydroxy compounds exhibit anti-perishing properties towards rubber either natural or synthetic. As to their fastness to light they are superior to most of the hitherto known anti-perishing agents.

From the chemical point of view our new products are characterized by their containing in chemical combination vinyl compounds of the aromatic series and aromatic hydroxy compounds and/or ethers thereof. Particular importance is attached to those resinous products which contain more than 8, for instance, about 8–12 molecules of the aromatic vinyl compound per each one molecule of the aromatic hydroxy compound or an ether thereof or a quantity of an aromatic hydroxy compound and an ether of an aromatic hydroxy compound corresponding to one molecule, these products showing the solubility in lacquers, benzines, drying or non-drying oils as pointed out above. As aromatic vinyl compounds we preferably employ styrene, though other aromatic vinyl compounds such as divinyl-benzene or vinyl naphthalene are not excluded from the scope of this invention. Examples of aromatic hydroxy compounds which have proved to be suitable for the purpose of this invention are phenol, ortho- or meta-cresol, 2-hydroxydiphenyl, 2.2'-dihydroxydiphenyl or naphthols. As to the ethers mixed aromatic-aliphatic ethers are preferred; the following examples are given: alkylphenol ethers such as anisol or phenetol, cresol-methyl ethers, exylenol-methyl ethers, resorcin-dimethyl-ether or glycerine-phenyl ethers; derivatives of these ethers such as oxalkyl phenyl ethers or aryloxyacetic acid esters are intended to fall within the scope of the term "ethers of aromatic hydroxy compounds." In the cases of mixtures of aromatic hydroxy compounds and ethers of aromatic hydroxy compounds the ethers are preferably employed in a molecular amount which is at least equal to that of the aromatic hydroxy compounds.

The polymerization is preferably effected in an indifferent solvent such as benzine, benzene or carbontetrachloride in order to secure an even course of the reaction. Suitable catalysts are tin tetrachloride, ferric chloride or borofluoracetic acid. Generally spoken, all compounds which exert a polymerizing action upon styrene are suitable for the purpose in question. The polymerization can be effected at normal or at slightly elevated temperature. The reaction being finished the catalyst can be removed by treating the reaction mixture with quick-lime, barium oxide or other reactive metallic oxides, it being preferable to add fuller's earth in order to increase the brightness of the products.

This application is a continuation in part of our copending application Serial No. 71,798 filed March 30, 1936.

The following examples illustrate the invention without, however, restricting it thereto, the parts being by weight:

Example 1

2 parts of borofluoroacetic acid are gradually introduced while stirring into a mixture of 100 parts of styrene, 10 parts of phenol and 50 parts of benzine at a temperature of 35° C. The temperature rises to 75° C. In order to complete the reaction, stirring is continued for some hours. Then the solution is diluted with 50 parts of benzine. After heating to about 90–100° C. the dilute reaction liquid is stirred thoroughly at this temperature for 1–2 hours with 10 parts of active fuller's earth. From the filtered liquid the volatile ingredients are then completely distilled off by heating to 210° C. in vacuo. 105 parts of a colorless resin are obtained, the softening point of which is 56° C. (according to Krämer-Sarnow). The resin is soluble in benzine, oil of turpentine, linseed oil, wood oil or stand oils. If instead of borofluoroacetic acid 2.5 parts of tin tetrachloride are employed as catalyst in a solution in benzine or carbon tetrachloride, also 105 parts of a colorless resin are obtained which exhibits a softening point of 68° C. and the same solubility as the above mentioned product.

Example 2

4 parts of borofluoroacetic acid are introduced into a solution of 20 parts of meta-cresol and 200 parts of styrene and about 200–240 parts of carbon tetrachloride. The mixture is stirred for some hours while cooling and then heated for several hours to about 90° C. The catalyst is then removed as described in Example 1. After distilling off the volatile ingredients 205 parts of a colorless resin are obtained of softening point 64° C. It yields solutions in lacquer benzine, drying oils or stand oils, which are stable even at 0° C.

Example 3

If in the mixture of Example 2 the meta-cresol is replaced by an equal amount of para-cresol, a light colored resin is obtained of softening point 61° C. which is soluble in lacquer benzine, oil of turpentine and linseed oil, but insoluble in viscous linseed-stand oil.

Example 4

200 parts of styrene are mixed with 20 parts of guaiacol and 300 parts of carbon tetrachloride. The mixture is stirred for some hours at room temperature while 4.4 parts of tin tetrachloride are added. After heating to 90° C. for 10 hours the reaction mixture is treated for several hours with 30 parts of calcium oxide and 30 parts of Florida earth. After filtration and distilling off the volatile ingredients 218 parts of a light colored resin are obtained, the softening point of which is 41° C. It exhibits the same solubility as the resin obtained according to Example 2.

Example 5

1 part of borofluoroacetic acid is added while stirring to the mixture of 100 parts of styrene, 100 parts of phenol and 100 parts of carbon tetrachloride. The temperature is gradually increased to 40° C. As soon as the temperature no longer rises, the reaction liquid is heated for some hours to 90° C. Then the diluent and the excess phenol are distilled off in vacuo, whereby the catalyst is removed at the same time, 152 parts of a thick liquid oil remain, which can be cleared by vacuum distillation. A viscous colorless oil is thereby obtained, which distills over at a temperature between 180 and 270° C. and a pressure of 12 mm. with decomposition. It is easily soluble in benzines, drying or non-drying oils and also stand oils. It shows a phenolic character and is easily soluble in dilute caustic soda.

Example 6

22 parts of 2-2'-dihydroxydiphenyl are dissolved in 200 parts of styrene the solution being diluted by 100 parts of benzine. After warming to 38–40° C. 1 part of borofluoroacetic acid is added while stirring, the reaction temperature being maintained below 100° C. by suitable cooling. After some hours the reaction is finished for the most part. After heating to 90° C. for 1 to 2 hours the reaction liquid is diluted by 100 parts of benzine. The dilute solution is treated for some hours with 20 parts of activated fuller's earth and 20 parts of quick-lime at a temperature of 90–100° C. while stirring. The volatile ingredients are completely distilled off from the filtered solution in vacuo. 214 parts of colorless resin are obtained which has a softening point of 75° C. and shows the same solubility as the resin obtained according to Example 2.

Example 7

1 part of tin tetrachloride is gradually added while stirring to a solution consisting of 30 parts of styrene, 5 parts of anisol and 25 parts of carbon tetrachloride. After some hours' stirring the reaction temperature rises to 68° C. Heating is continued for 1–2 hours to 90° C. After dilution with 15 parts of carbon tetrachloride the reaction solution is treated at 90° C. while stirring for some hours with 10 parts of quick-lime. After distilling off in vacuo the volatile substances from the filtrate, 30 parts of a transparent resin are obtained which is easily soluble in benzine and drying oils and has a softening point of 42° C.

Example 8

3 parts of borofluoroacetic acid are gradually added while stirring to a solution at about 24° C. consisting of 300 parts of styrene, 35 parts of phenetol and 240 parts of carbon tetrachloride or benzine. The reaction temperature rises to 70° C. When the chief part of the reaction is complete, the liquor is heated to 90° C. and stirred for 3 hours at 90–95° C. with 20 parts of barium oxide and 20 parts of fuller's earth. After working up as described in Example 7, 309 parts of a nearly colorless resin are obtained of softening point 52.4° C. and good fastness to light, and the resin yields solutions in benzine and drying oils.

Example 9

To a solution at 30° C. of 400 parts of styrene and 50 parts of meta-cresol-methyl-ether in 160–200 parts of benzine of boiling point 95–130° C., 4 parts of borofluoroacetic acid are gradually added while thoroughly stirring. The temperature rises to 57° C. Stirring is continued for 5 hours, the reaction solution is heated for 2 hours to 80° C., and then diluted with 150–180 parts of benzine.

The diluted reaction solution is stirred at 90° C. with a mixture of 20 parts of calcium oxide and 20 parts of activated fuller's earth. From the filtered solution the volatile substances are completely distilled off in vacuo at about 210° C. 434 parts of colorless resin are thus obtained of softening point 61–62° C. (according to the method of Krämer-Sarnow). The resin yields solutions which are stable even at 0° C. in the usual lacquer benzines, in linseed oil and wood oil.

Example 10

5 parts of borofluoroacetic acid are gradually added while stirring to a solution at about 20° C. consisting of 40 parts of symmetric metaxylenylmethyl ether, 400 parts of styrene and 200–300 parts of carbon tetrachloride or benzine. After a short time the temperature rises, but care must be taken by suitable cooling that the reaction temperature does not exceed 90° C. Stirring is continued for 5–8 hours and finally the mixture is heated to 90° C. After dilution with 200 parts of carbon tetrachloride or benzine the reaction solution is stirred for 1–2 hours at 80–90° C. with 20 parts of calcium oxide and 20 parts of fuller's earth, whereupon it is filtered by suction. After distilling off the volatile substances in vacuo, 424 parts of a transparent resin are obtained from the filtered solution by heating to about 200–210° C. The resin is soluble in lacquer linseed oil and wood oil and has a softening point of 58° C.

Example 11

3 parts of borofluoroacetic acid are gradually added while thoroughly stirring to a mixture at 20° C. consisting of 26.4 parts of resorcin-dimethyl-ether, 200 parts of styrene and 160 parts of benzene. A viscous solution is formed with a vigorous evolution of heat. When the reaction is complete, the solution is heated to 90° C. and stirred for 3 hours at this temperature with 20 parts of calcium oxide and 20 parts of fuller's earth. From the filtered solution the volatile substances are distilled off in vacuo at 220° C. 219 parts of a very clear resin remain, which is soluble in benzine, turpentine oil, drying or non-drying oils and has a softening point of 54° C.

Example 12

To a solution at 20–25° C. 300 parts of styrene and 40 parts of phenoxyethanol in 250 parts of carbon tetrachloride, 20 parts of borofluoroacetic acid are gradually added while stirring. When the reaction is complete the liquor is worked up as mentioned above. After distilling off the volatile substances 338 parts of a light-colored resin are obtained having a softening point of 56° C. The resin may be applied with advantage for the manufacture of oil lacquers.

Example 13

A mixture of 30 parts of styrene with 37 parts of meta-cresol-methyl-ether is stirred for 3 hours with 1.5 parts of borofluoroacetic acid or tin tetrachloride, heated for 3 hours to 90° C. and diluted with 50 parts of carbon tetrachloride. The catalyst is removed by stirring the reaction solution for several hours with 10 parts of calcium oxide. From the filtered solution, after distilling off the carbon tetrachloride and the unchanged meta-cresol-methyl-ether, 43 parts of a viscous colorless oil are obtained by distillation in vacuo; it has a boiling point of 180–270° C. at a pressure of 12 mm. It may be employed, for example, as softening agent for cellulose ethers.

Example 14

3 parts of borofluoroacetic acid are added while stirring to a mixture of 300 parts of styrene, 36 parts of crude cresol-methyl-ether (mixture of ortho-, meta- and para-cresol-methyl-ether having a boiling point of 155–178° C.) and 240 parts of carbon tetrachloride. The temperature rises from 23° C. to 60° C. The reaction mixture is worked up in the usual manner; 295 parts of a resin are obtained which is soluble in benzine and oils and has a softening point of 58° C.

Example 15

12 parts of borofluoroacetic acid are gradually added while stirring to a solution at 36° C. consisting of 36 parts of glycerine-α-phenyl-ether, 177 parts of styrene and 208 parts of carbon tetrachloride. The reaction temperature rises to 70° C. The reaction mixture is then allowed to stand for about a day, after which it is diluted with 200 parts of carbon tetrachloride and heated to 90° C. while thoroughly stirring with 50 parts of calcium oxide at 90–95° C. After working up, 208 parts of a resin having a softening point of 52° C. are obtained which is soluble in lacquer benzine and drying oils.

Example 16

To a solution consisting of 218 parts of styrene, 45 parts of β-naphthol-amylether and 160 parts of carbon tetrachloride or benzene, 3 parts of tin tetrachloride or borofluoroacetic acid are gradually added while stirring. The reaction is complete after some hours. After heating the reaction mixture for 1 hour to 90° C. the catalyst is removed in the usual manner. After distilling off the volatile substances in vacuo at 220–230° C. a light-colored resin remains which is soluble in benzine, turpentine oil, drying oils and stand oils, and has a softening point of 50° C.

Example 17

From a solution consisting of 210 parts of styrene, 42 parts of cresoxyacetic acid-ethylester (obtained from crude cresol), 160 parts of carbon tetrachloride and 4 parts of borofluoroacetic acid, 230 parts of light-colored resin having a softening point of 56° C. are obtained while working as described in Example 16. The resin may be employed for the manufacture of lacquers.

Example 18

3 parts of borofluoroacetic acid are added to 75 parts of styrene, 100 parts of ortho-cresol-methyl-ether and 90 parts of benzene or carbon tetrachloride. The temperature rises quickly, care being taken by suitable cooling that the reaction temperature does not exceed 70° C. The reaction being finished the catalyst is removed by the addition of quick-lime, whereupon the reaction mixture is worked up as described above. After distilling off the diluent and the unchanged cresol ether, 111 parts of an oil of good stability towards alkalis and acids are obtained which boils under 14 mm. mercury pressure at 180–250° C. It may be employed with advantage as softening agent for plastic masses.

Example 19

To a mixture of 208 parts of styrene with 272 parts of crude-cresol-ethyl-ether, 10 parts of borofluoroacetic acid are gradually added while stirring.

By suitable cooling care is taken that the reaction temperature does not exceed 75–80° C. As soon as the temperature no longer rises, the liquor is heated for 1–2 hours to 90° C., diluted with 200–300 parts of carbon tetrachloride and thoroughly stirred for some hours at 90° C. with about 70 parts of calcium oxide. From the filtered solution the carbon tetrachloride and the unchanged cresol ether are distilled off. After distilling off the residue in vacuo 300 parts of a colorless oil are obtained which distills at 180–310° C. under a 13 mm. mercury pressure.

Example 20

48 parts of glycerinediphenylether are diluted with a mixture consisting of 160 parts of carbon tetrachloride and 200 parts of styrene. 8 parts of borofluoroacetic acid are added thereto while stirring over a period of some hours. When the reaction is complete the liquor is heated to 90° C. diluted with 100 parts of carbon tetrachloride and stirred with 60 parts of quick-lime and 20 parts of fuller's earth for several hours at 85–90° C. After distilling off the volatile substances from the filtered mixture, 229 parts of a resin are obtained which is soluble in benzine and stand-oils and has a softening point of 61° C.

Example 21

4 parts of borofluoroacetic acid are added to 130 parts of divinylbenzene and 108 parts of meta-cresol dissolved in 130 parts of carbon tetrachloride, care being taken by suitable cooling to ensure that the reaction temperature does not exceed 30° C. After 6 hours the reaction temperature no longer rises. After stirring for some hours at 25° C. the mixture is diluted with a further 100 parts of carbon tetrachloride and heated with addition of 30 parts of calcium oxide and 50 parts of fuller's earth for 3 hours at 80° C. From the filtered solution the diluent and a small quantity of unchanged cresol is distilled off. 27 parts of an oil which is soluble in dilute sodium lye are distilled at 190–205° C. at a pressure of 6 mm. 200 parts of a light-colored resin remain which is soluble in linseed oil and in linseed-standoil.

Example 22

4 parts of borofluoroacetic acid are added at 35° C. to a solution of 130 parts of divinyl benzene, 216 parts of crude cresol and 130 parts of carbon tetrachloride. The temperature having risen to 90° C. by the immediately occurring reaction, the mixture is cooled to 25° C. and then allowed to stand at this temperature for 12 hours. The catalyst is removed by stirring the reaction mixture for some hours with calcium oxide at 80° C. and subsequent filtration. After distilling off the diluent and small quantities of unchanged cresol the residue is distilled in vacuo. 310 parts of a very viscous oil are distilled from 190–330° C. at a pressure of 6 mm. The first boiling constituent is soluble in sodium lye.

Example 23

2 parts of tin tetrachloride are added to a mixture consisting of 60 parts of divinylbenzene, 77 parts of beta-naphtholethyl ether and 70 parts of carbon tetrachloride and the whole is stirred for 12 hours at a temperature not exceeding 20° C. After dilution with further quantities of carbon tetrachloride and the addition of calcium oxide and fuller's earth the reaction mixture is heated for 3 hours to 80° C. From the filtered solution the diluent and a small quantity of unchanged beta-naphtholethylether are distilled off. After removing the volatile substances by vacuum distillation 120 parts of a light-yellow resin are obtained.

Example 24

To a mixture of:

| | Parts |
|---|---|
| Styrene | 156 |
| Monophenylglycolether | 14.5 |
| Phenol | 4.2 |
| Xylene | 100 |

10 parts of borofluoroacetic acid are slowly added at 20–30° C. while stirring the mixture. The temperature gradually rises to 50–55°. After the reaction is complete the liquid is diluted with about 100 parts of xylene and stirred with a mixture of 30 parts of lime and 6 parts of soda lime for 10–15 hours. From the filtered solution the volatile substances are completely distilled off in vacuo. 174 parts of a nearly colourless resin of a softening point of 61–63° C. are thus obtained. The resin is excellently soluble in oil of turpentine, white spirit, drying oils and heat-bodied oils and can be used with advantage in the manufacture of wood oil lacquers.

To prepare such lacquers for instance 1 part of the resin thus obtained and 2–4 parts of tung oil are heated for 30–40 minutes to 240° C. After cooling down to 150° C. the molten mass is diluted with 1.5–2 parts of oil of turpentine and cobalt-lead-driers are added. These varnishes are gas-proof; they are drying in 2–3 hours; the dry coatings show a high lustre.

Example 25

To a mixture of:

| | Parts |
|---|---|
| Styrene | 156 |
| Cresoxyethanol | 13 |
| Phenol | 5.7 |
| Toluene | 100 |

5 parts of waterfree ferric chloride are gradually added in small quantities at room-temperature while thoroughly stirring the mixture. With a rise of temperature to 40–50° C. the formation of the resin is complete after several hours. The reaction product is then diluted with 150 parts of toluene and the liquid is stirred with 50 parts of quick-lime for several hours at 60° C. From the filtered solution the volatile substances are distilled off. 160 parts of a light-coloured resin of a softening point of 67–68° C. are thus obtained. The resin is soluble in linseed oil, wood oil and turpentine substitutes and can also be worked with cellulose ethyl ether into homogeneous lacquer-coatings and thermoplastic masses.

Example 26

36 parts of glycerinediphenylether are dissolved in a mixture of:

| | Parts |
|---|---|
| Styrene | 312 |
| Cresol | 16 |
| Toluene | 200 |

Thereupon 9 parts of borofluoracetic acid are gradually added to the solution at about 20° C. while stirring the mixture. The temperature rises and in the course of several hours the formation of the resin has become complete. The reaction liquid is then worked up as described in the Examples 1 and 2. 360 parts of an almost waterclear resin of a softening point of 68° C. are obtained which can be used for various lacquer purposes and for the manufacture of artificial masses in combination with cellulose ethers.

Example 27

To a mixture of:

| | Parts |
|---|---|
| Styrene | 208 |
| Anisol | 10.8 |
| Phenol | 9.4 |
| Toluene | 160 |

3.5 parts of borofluoracetic acid are gradually added at room temperature while stirring the mixture. The reaction is complete after several hours. After 10-15 hours it is diluted with 100-150 parts of toluene and worked up in the usual manner.

228 parts of a very light-coloured resin of a softening point of 61° C. is obtained which can be used with advantage in the manufacture of wood oil lacquers.

*Example 28*

5 parts of borofluoracetic acid are gradually added to a solution consisting of:

| | Parts |
|---|---|
| Styrene | 208 |
| m-Chlorophenol | 12.8 |
| o-Cresolmethylether | 12.1 |
| Toluene | 100 | while stirring the mixture. The reaction proceeds with the evolution of heat. The temperature is allowed to rise to about 45° C.; the reaction solution is worked up in the usual manner. 218 parts of a light-coloured resin of a softening point of 68° C. are obtained.

*Example 29*

To a mixture of:

| | Parts |
|---|---|
| Styrene | 520 |
| A technical phenoxyethanol containing about 23% phenol | 62.4 |
| Toluene | 300 |

37 parts of borofluoracetic acid are gradually added at room temperature. The temperature rises to about 50° C. After the reaction is complete the solution is diluted with about 200-300 parts of toluene and stirred for several hours with a mixture of 100 parts of quick-lime and 20 parts of soda lime. From the filtered solution the volatile substances are distilled off. 578 parts of a nearly colourless resin of a softening point of 62-64° C. are obtained. The resin thus obtained is easily soluble in drying oils as well as in stand oils and white spirit and preferably suitable for the manufacture of highly-valuable tung oil varnishes.

*Example 30*

A mixture of:

208 parts of styrene and
30 parts of a raw technical xylenylmonoglycolether, containing about 30-32% xylenols or phenols, in
150 parts of toluene is stirred with about 15 parts of borofluoracetic acid. The temperature is allowed to rise to about 50° C.; the reaction mixture is worked up in the usual manner.

About 230 parts of a light-coloured resin are obtained showing the properties of the resin prepared according to Example 29.

*Example 31*

22.6 parts of a technical phenetol containing 5.3 parts of phenol, and 100 parts of toluene are added to 229 parts of styrene. 5 parts of tin tetrachloride are gradually admixed so that the reaction takes place at 35-40° C. After the reaction is complete the catalyzer is removed by stirring the reaction mixture with about 25 parts of soda lime and subsequent filtration. Hereafter the solvent is distilled off. 246 parts of a light-coloured resin of a softening point of 65° C. are obtained as residue. This resin is easily soluble in lacquer benzine, oil of turpentine and drying oils.

We claim:

1. The process which comprises causing an acid reacting polymerization catalyst which is capable of polymerizing styrene to react upon a mixture of an aromatic hydrocarbon substituted by the radical $CH_2=CH-$ and at least one aromatic oxygen-containing compound selected from the group consisting of aromatic hydroxy compounds and ethers of aromatic hydroxy compounds, the aromatic hydrocarbon substituted by the radical $CH_2=CH-$ being present in the ratio of from 0.5 to 16.3 mols per mol of aromatic oxygen-containing compound.

2. The process which comprises causing an acid reacting polymerization catalyst which is capable of polymerizing styrene to react upon a mixture of styrene and at least one aromatic oxygen-containing compound selected from the group consisting of aromatic hydroxy compounds and ethers of aromatic hydroxy compounds, the styrene being present in the ratio of from 0.5 to 16.3 mols per mol of aromatic oxygen-containing compound.

3. The process which comprises causing an acid reacting polymerization catalyst which is capable of polymerizing styrene to react upon a mixture of styrene and phenol, the styrene being present in the ratio of from 0.5 to 16.3 mols per mol of phenol.

4. The process which comprises causing an acid reacting polymerization catalyst which is capable of polymerizing styrene to react upon a mixture of styrene and a cresol ether, the styrene being present in the ratio of from 0.5 to 16.3 mols per mol of cresol ether.

5. The process which comprises causing an acid reacting polymerization catalyst which is capable of polymerizing styrene to react upon a mixture of an aromatic hydrocarbon substituted by the radical $CH_2=CH-$, an aromatic hydroxy compound and an ether of an aromatic hydroxy compound, the aromatic hydrocarbon substituted by the radical $CH_2=CH-$ being present in the ratio of from 0.5 to 16.3 mols per mol of aromatic hydroxy compound and ether of aromatic hydroxy compound.

6. The process which comprises causing an acid reacting polymerization catalyst which is capable of polymerizing styrene to react upon a mixture of styrene, an aromatic hydroxy compound and an ether of an aromatic hydroxy compound, the styrene being present in the ratio of from 0.5 to 16.3 mols per mol of aromatic hydroxy compound and ether of aromatic hydroxy compound.

7. Polymeric products of aromatic hydrocarbons substituted by the radical $CH_2=CH-$ containing in chemical combination at least one aromatic oxygen-containing compound selected from the group consisting of aromatic hydroxy compounds and ethers of aromatic hydroxy compounds, the aromatic hydrocarbon substituted by the radical $CH_2=CH-$ constituents being present in the ratio of from 0.5 to 16.3 mols per mol of aromatic oxygen-containing compound, said products being identical with the products produced by the process of claim 1.

8. Polymeric products of aromatic hydrocarbons substituted by the radical $CH_2=CH-$, containing in chemical combination aromatic hydroxy compounds and ethers of aromatic hydroxy compounds, the aromatic hydrocarbon substituted by the radical $CH_2=CH-$ constituents being present in the ratio of from 0.5 to 16.3 mols per mol of aromatic hydroxy compound and ether of aromatic hydroxy compound, said products being identical with the products produced by the process of claim 5.

9. Polymeric products of styrene containing in chemical combination aromatic hydroxy compounds and ethers of aromatic hydroxy compounds, the styrene being present in the ratio of from 0.5 to 16.3 mols per mol of aromatic hydroxy compound and ether of aromatic hydroxy compound, said products being identical with the products produced by the process of claim 6.

10. Polymeric products of aromatic hydrocarbons substituted by the radical $CH_2=CH-$ containing in chemical combination at least one aromatic oxygen-containing compound selected from the group consisting of aromatic hydroxy compounds and ethers of aromatic hydroxy compounds, the aromatic hydrocarbon substituted by the radical $CH_2=CH-$ constituents being present in the ratio of from 8 to 12 mols per mol of aromatic oxygen-containing compound, said products being identical with the products produced by the process of claim 13.

11. Polymeric styrenes containing in chemical combination from 0.5 to 16.3 mols of styrene per mol of phenol, these products being soluble in lacquer benzines and in drying or non-drying oils, said products being identical with products produced by the process of claim 3.

12. Polymeric styrenes containing in chemical combination from 0.5 to 16.3 mols of styrene per mol of a cresol ether, these products being soluble in lacquer benzines and in drying or non-drying oils, said products being identical with products produced by the process of claim 4.

13. The process which comprises causing an acid reacting polymerization catalyst which is capable of polymerizing styrene to react upon a mixture of an aromatic hydrocarbon substituted by the radical $CH_2=CH-$ and at least one aromatic oxygen-containing compound selected from the group consisting of aromatic hydroxy compounds and ethers of aromatic hydroxy compounds, the aromatic hydrocarbon substituted by the radical $CH_2=CH-$ being present in the ratio of from 8 to 12 mols per mol of aromatic oxygen-containing compound.

LEO ROSENTHAL.
HELMUTH MEIS.